United States Patent [19]

Takahashi

[11] Patent Number: 4,514,630

[45] Date of Patent: Apr. 30, 1985

[54] OPTICAL SYSTEM FOR INTRUDER DETECTING DEVICE

[75] Inventor: Toshihiko Takahashi, Kyoto, Japan

[73] Assignee: Takenaka Engineering Co., Ltd., Kyoto, Japan

[21] Appl. No.: 420,222

[22] PCT Filed: Dec. 28, 1981

[86] PCT No.: PCT/JP81/00431

§ 371 Date: Sep. 14, 1982

§ 102(e) Date: Sep. 14, 1982

[87] PCT Pub. No.: WO82/02609

PCT Pub. Date: Aug. 5, 1982

[30] Foreign Application Priority Data

Jan. 19, 1981 [JP] Japan .............................. 56-6102[U]

[51] Int. Cl.³ .......................... G08B 13/18; G01J 5/08

[52] U.S. Cl. ..................................... 250/342; 250/353

[58] Field of Search ................ 250/342, 353; 350/299, 350/292; 362/327

[56] References Cited

U.S. PATENT DOCUMENTS 1,818,120 8/1931 Doane ................................ 362/299
3,551,676 12/1970 Runnels .............................. 250/353
3,984,178 10/1976 Bergqvist .
4,258,255 3/1981 Guscott .
4,271,360 6/1981 Ward .................................. 250/353

FOREIGN PATENT DOCUMENTS 51-114141 10/1976 Japan .
52-138952 11/1977 Japan .
55-143694 11/1980 Japan .

*Primary Examiner*—Alfred E. Smith
*Assistant Examiner*—Constantine Hannaher
*Attorney, Agent, or Firm*—Morgan, Finnegan, Pine, Foley & Lee

[57] ABSTRACT

An optical system for an intruder detector which employs an infrared ray detecting element and a parabolic mirror above the infrared detecting element for collecting infrared rays from a detection region and directing them onto the infrared ray detecting element, and which has a detecting range through a wide visual field of 360°. Reflecting mirrors 3 having the visual field of 360° are disposed around the outside of a parabolic mirror and confront the parabolic mirror 1 around the outer periphery of the infrared ray detecting element 2. A window 5 which transmits infrared rays and does not shield the visual field of the mirror 3 mounts the parabolic mirror 1 at a prescribed position with respect to a base 6. A convex lens 15 located at the conical axis of the parabolic mirror 1 forms another detection region directly under the intruder detecting device. The intruder detector using this optical system is mainly for mounting on the ceiling of a house.

3 Claims, 5 Drawing Figures

OPTICAL SYSTEM FOR INTRUDER DETECTING DEVICE

TECHNICAL FIELD

This invention relates to an optical system of a device for detecting intruders which makes use of a straight beam of light or infrared rays.

BACKGROUND ART

Presently known intruder detectors making use of a straight beam of light or infrared rays generally utilize a parabolic mirror as an optical element to increase the density of a collected beam in a projecting or an accepting direction, the focal position of the mirror being occupied by a photo-electric transducer.

A passive type intruder detector compares infrared energy radiated from an intruder's body with infrared energy radiated from a background material object and generates an output signal when there is a difference above a predetermined level. An intruder detecting device of this type is disclosed in Japanese Laid-Open Utility Model Publication No. 97,534 of 1980 and Japanese Laid-Open Patent Publication No. 143,694 of 1980. Because the visual field of this infrared detector is a maximum angle of 90 degress, any extension of a detecting region beyond said visual field is dependent upon the optical elements in the system. In the device disclosed by said Laid-Open Patent Publication No. 143,694 of 1980, the sensing region may be extended to an angle of approximately 180 degrees by combining a parabolic mirror with an alignment structure of plane mirrors. However, where the device is mounted on the ceiling of a structure, the device has no sensitivity in the backward direction or generally in the downward direction. It should also be noted that the alignment structure of the plane mirrors is arranged into steps of mirrors, and therefore, it is different to incline each of the divided plane mirrors with respect to the optical axis of the parabolic mirror so as to obtain a larger number of directions sensitive to intruders, and to equalize all the effective projecting areas of the divided mirrors onto the parabolic mirror. Another difficult problem in the prior device is that each of the outer distributed plane mirrors cannot project their whole mirror surface onto the parabolic mirror, and therefore a substantial difference exists between the sensitivity of the inner and the outer mirrors.

It is an object of the invention to solve the above technical problems by providing a simply constructed optical system for an intruder detector in which the detecting region expands an angle of 360 degrees, and in which no substantial difference in sensitivity is present for the various detecting directions.

DISCLOSURE OF THE INVENTION

To achieve the above object of the invention, an infrared ray detecting element is disposed at the focal position of a parabolic mirror. Facing the parabolic mirror is a conical reflecting mirror which is disposed in such a manner that it surrounds the infrared detecting element so that its visual field covers the periphery of the parabolic mirror. The reflecting mirror is comprised of a plurality of divided mirror elements. Each of the mirror elements is directed to a particular detecting region so that all the mirror elements together cover a detecting field having an angle of 360 degrees around the infrared detecting element. If the angle of inclination of each mirror element with respect to the optical axis of the parabolic mirror is modified, the angular extent of the detecting field may be varied. Perforated through the central portion of the parabolic mirror, perpendicular to its optical axis, is an opening having an inner diameter substantially the same as the outer diameter of the infrared detecting element. A convex lens mounted in the opening is focused on the activation surface of the infrared detecting element. The parabolic mirror is mounted to a base member through a cylindrical window member which is transparent to infrared rays. An optical masking plate is provided with a plurality of slits each corresponding to one of the gaps between adjacent divided mirrors. The masking plate is disposed in a fixed position between the parabolic mirror and the reflecting mirror to allow the slit portions to make the projections of detection.

The reflecting mirror can easily be molded, since the form of the mirror is a simple one such as a cone. Optical sensitivity in each of the individual detection directions can be made uniform by the conical form, even though a significant directional detection in each of the detection directions is made to increase the density of collection of infrared rays. The window, which has a good transparency to infrared rays, allows the parabolic mirror to be correctly positioned with respect to the base member without any post supporting the parabolic mirror.

This allows the detection regions covered by the device to extend over an angular extent of 360 degrees. The portion of the parabolic mirror surrounding its optical axis cannot effectively direct a beam reflected from the reflecting mirror to the infrared detecting element. However, a convex lens fitted in said portion allows an intruder immediately below the device to be detected. The extent of the detection region relative to the optical axis of the parabolic mirror is controlled by the selection of the angle of inclination with respect to the optical axis. The masking plate eliminates from the detection field any background that may cause a false alarm due to unstable infrared energy radiation therefrom.

BEST MODE OF CARRYING OUT THE INVENTION

Figure 1:
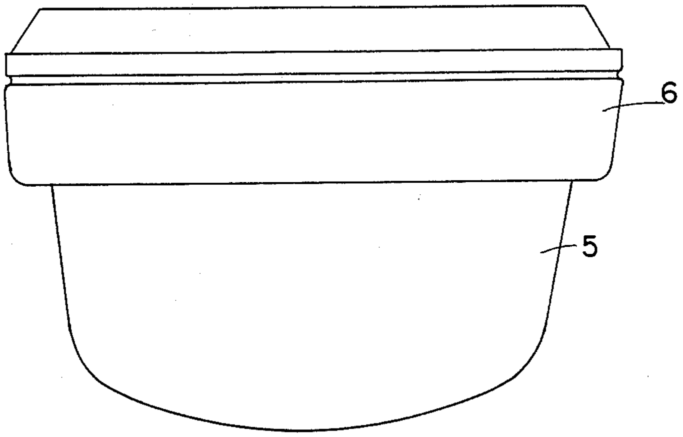
FIG. 1 is a front view of the exterior of an intruder detecting device according to the invention.
Figure 2:
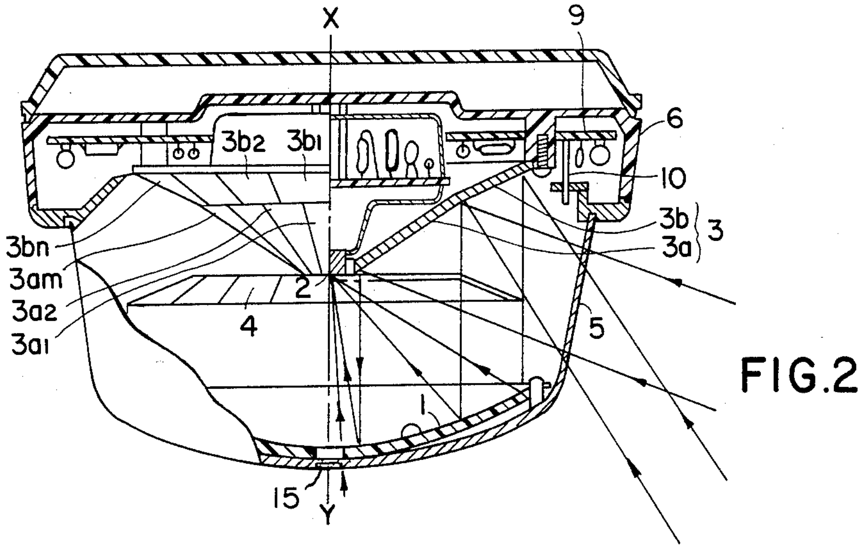
FIG. 2 is a partial cross sectional view of the device shown in FIG. 1.
Figure 3:
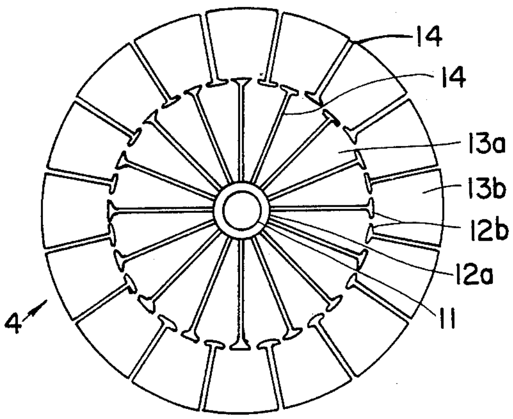
FIG. 3 is a plan view of an optical masking plate.
Figure 4:
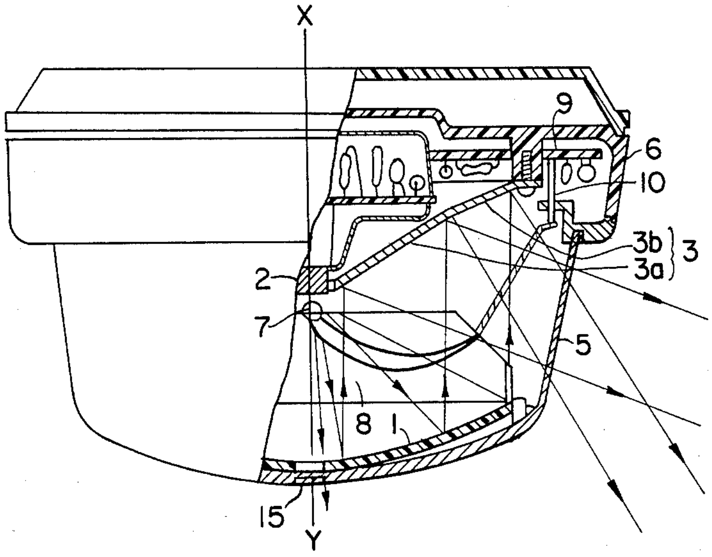
FIG. 4 is a cross sectional view partially cut away of the device showing the arrangement of a visual light source at the portion about the focal point of a parabolic mirror.

The preferred embodiment of the invention will now be described in conjunction with the reference numerals shown in the drawings.

An infrared ray detecting element (hereinafter "detecting element") 2 and a wiring substrate 9 are both placed within a base member 6. The substrate 9 supports an electric circuit (not shown) which produces an output when any intruder is approaching the device. The base member 6 is also provided with a conical reflecting mirror 3 surrounding the pheriphery of the detecting element 2. The mirror 3 is comprised of two groups of mirrors 3a and 3b each having inclination angles with respect to the optical axis of a parabolic mirror 1 (as later described) different from each other. The groups of mirrors 3a and 3b are also comprised of a plurality of divided plane mirrors 3am and 3bn, respectively. All the divided mirrors in the two groups are made to have directivities along the individual detecting directions to increase light collecting density. THe boundary between every adjacent two inner divided mirrors 3am is circularly displaced from the boundary between every adjacent two outer divided mirrors 3bn. Thereby, a blank detection area in each of the boundaries can be compensated for with the corresponding divided mirror 3am to form a detecting field radially extending 360 degrees. A masking plate 4 is interposed between the reflecting mirror 3 and the parabolic mirror 1, and a through-holed boss 11 of the plate is fitted in a bore of the center portion of the reflecting mirror 3. The masking plate 4 includes a plurality of radially extending slits 14 wich divide the plate into a plurality of inner and outer segment portions 13a and 13b, respectively, while leaving inner and outer yoke sections 12a and 12b. The segment portions 13a and 13b are separate from the yoke sections. The plurality of segment portions 13a correspond to the divided plane mirrors 3am, while the other plurality of segment portions 13b correspond to the other divided plane mirrors 3bn. Travelling through the slits or cut-off portions 14 between the segment portions 13a and 13b are infrared rays from the detecting field which are incident upon the parabolic mirror 1 and infrared rays which are reflected from mirror 1 and directed to the detecting element 2.

The parabolic mirror 1 is mounted to the base member 6 by a cover-like window 5 which is transparent to infrared rays. The focal point of the parabolic mirror 1 is caused to correspond with the activation surface of the detecting element 2 by the location thereof. At the central portion about the optical axis of the parabolic mirror 1 a central bore is provided to fit therein a convex lens 15. The focal point of the convex lens 15 is caused to correspond with the activation surface of the detecting element 2 so that a detecting field along the optical axis of the parabolic mirror can also be established.

The infrared ray transparent window 5 is detachable from the base member 6 by releasing a fitting holding the window on the member. Therefore, the visual recognition of detecting regions by the detecting element 2 can be achieved. The operation of said visual recognition is comprised of the steps of placing a visual light source 7 such as a photo-diode which had been independently prepared, near the focal point of the parabolic mirror 1 using a support member 8; applying to said light source 7 a voltage from an electric supply pin member 10 provided on the wiring substrate 9; and visually observing the lighting field from said energized light source 7. In this case, a pedestrian check and an associative indication cannot be executed to dynamically recognize the detecting field.

Figure 5:
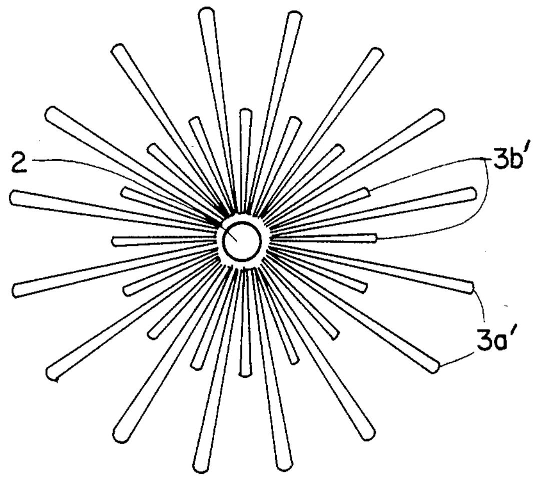
FIG. 5 is a plan view of the region detected by a reflecting mirror consisting of a plurality of divided plane mirrors.

FIG. 5 is a plan view showing the detection regions 3a' covered by the inner divided plane mirrors 3am and the detection regions 3b' covered by the outer divided plane mirrors 3bn. The amount of infrared rays which are collected by such mirrors can be increased by limiting the width of each of the detection regions 3a' and 3b'. This allows the electric gain of the device to be correspondingly decreased so as to eliminate any outcoming noise, and in particular, errors caused by electric wave disturbances. The divided plane mirrors may also be replaced with any rounded mirrors. In this case, the extent of cross sectional area perpendicular to each detection direction will be varied.

I claim:

1. An optical system for an intruder detector device including a parabolic mirror and an infrared detecting element positioned at the focal point of said parabolic mirror for detecting the entry of an intruder and generating an output signal in response to said entry, comprising:

a conical reflecting mirror positioned at the periphery of said infrared detecting element and facing the parabolic surface of said parabolic mirror, the visual field of said reflecting mirror covering said parabolic mirror up to its periphery, said reflecting mirror being an assembly comprised of a plurality of divided plane mirrors separated into an inner group and an outer group circularly displaced from said inner group; and a convex lens disposed at the center of the parabolic mirror, and being perpendicular to the optical axis thereof, said lens having substantially the same diameter as the outer diameter of the detecting element, and focussing infrared rays from immediately below the detector device onto the activation surface of the detecting element.

2. An optical system for an intruder detector device as recited in claim 1 wherein said divided plane mirrors of said reflecting mirror have a predetermined plurality of angles relative to the optical axis of the parabolic mirror.

3. An optical system for an intruder detector device as recited in claim 1 wherein said parabolic mirror is mounted on and supported by an infrared transparent window so that the detection region covered by said detector is extended in all directions, said window being attached to a base member mounting said detecting element and acting as a cover for said parabolic mirror.

* * * * *